United States Patent
Kalke et al.

(10) Patent No.: US 7,215,730 B2
(45) Date of Patent: May 8, 2007

(54) METHOD AND ARRANGEMENT FOR MULTIRESOLUTIVE RECONSTRUCTION FOR MEDICAL X-RAY IMAGING

(75) Inventors: Martti Kalke, Tuusula (FI); Samuli Siltanen, Helsinki (FI); Simopekka Vänskä, Vantaa (FI); Matti Lassas, Helsinki (FI); Maaria Rantala, Espoo (FI)

(73) Assignee: GE Healthcare Finland Oy, Helsinki (FI)

( * ) Notice: Subject to any disclaimer, the term of this patent is extended or adjusted under 35 U.S.C. 154(b) by 245 days.

(21) Appl. No.: 11/027,482

(22) Filed: Dec. 30, 2004

(65) Prior Publication Data

US 2006/0146983 A1 Jul. 6, 2006

(51) Int. Cl.
*H05G 1/60* (2006.01)

(52) U.S. Cl. .......................................................... 378/4

(58) Field of Classification Search .............. 378/4–27, 378/38–40, 51–55, 62–63, 901; 382/131, 382/132

See application file for complete search history.

(56) References Cited

U.S. PATENT DOCUMENTS

| | | | | |
|---|---|---|---|---|
| 5,717,791 | A | * | 2/1998 | Labaere et al. ............. 382/274 |
| 6,614,429 | B1 | * | 9/2003 | Zhang et al. ................ 345/420 |
| 6,768,782 | B1 | * | 7/2004 | Hsieh et al. .................... 378/8 |
| 2005/0047636 | A1 | * | 3/2005 | Gines et al. ................. 382/131 |
| 2005/0286795 | A1 | * | 12/2005 | Zhang ......................... 382/268 |
| 2006/0029279 | A1 | * | 2/2006 | Donoho ....................... 382/232 |

OTHER PUBLICATIONS

Delaney et al., Multiresolution Tomographic Reconstruction Using Wavelets, IEEE Transactions on Image Processing, vol. 4, No. 6, Jun. 1995.*

* cited by examiner

*Primary Examiner*—Edward J. Glick
*Assistant Examiner*—Alexander Taningco
(74) *Attorney, Agent, or Firm*—Andrus, Sceales, Starke & Sawall, LLP

(57) ABSTRACT

A medical X-ray device arrangement for producing three-dimensional information of an object in a medical X-ray imaging, the medical X-ray device arrangement comprising an X-ray source for X-radiating the object from at least two different directions and a detector for detecting the X-radiation to form projection data of the object. The medical X-ray device arrangement comprises means for modelling X-ray attenuation coefficient of said object using a multiresolution representation, eliminating part of the coefficients in said multiresolution representation to form reduced multiresolution representation, and utilizing said projection data in a regularized reconstruction method based on minimizing the penalty $$F(f)=\|Af-m\|2/2+\alpha\|f\|_B+\beta g(f)$$

over the coefficients in the said reduced multiresolution representation to produce three-dimensional information of the object.

16 Claims, 13 Drawing Sheets

METHOD AND ARRANGEMENT FOR MULTIRESOLUTIVE RECONSTRUCTION FOR MEDICAL X-RAY IMAGING

BACKGROUND OF THE INVENTION

Three-dimensional X-ray imaging is based on taking several one-dimensional (1-D) or two-dimensional (2-D) projection images of a three-dimensional (3-D) body from different directions. If 1-D projection images are available from all around a 2-D slice of the body with dense angular sampling, the inner structure of the slice can be determined. This is known as Computerized Tomography (CT) imaging technology, which is widely used in medicine today. A crucial part of CT technology is the reconstruction algorithm taking the X-ray images as argument and returning a voxel representation of the 3-D body.

A collection of X-ray images of a 3-D body is called sparse projection data if (a) the images are taken from a limited angle of view or (b) there is only a small number of images. Sparse projection data does not contain sufficient information to completely describe the 3-D body. However, in many practical imaging situations only sparse projection data is available.

Traditional reconstruction algorithms such as filtered back-projection (FBP), Fourier reconstruction (FR) or algebraic reconstruction technique (ART) do not give satisfactory reconstructions from sparse projection data. Reasons for this include requirement for dense full-angle sampling of data and difficulty to use a priori information, for example non-negativity of the X-ray attenuation coefficient. In the case of limited-angle data, tomosynthesis can be applied to produce reconstructions of the body along 2-D slices through the body. However, the tomosynthetic slices suffer from blurring that severely compromises image quality.

BRIEF DESCRIPTION OF THE INVENTION

The aim of the invention is to overcome the problems met in 3-D reconstruction of the body that occur when using traditional reconstruction algorithms with sparse projection data. This is achieved by a method for producing three-dimensional information of an object in medical X-ray imaging in which method the object is X-radiated from at least two different directions and the said X-radiation is detected to form projection data of the object. The X-ray attenuation coefficient inside the object is represented by a linear combination of multiresolution basis functions. This multiresolution representation is such that not all of the basis functions are needed to represent the unknown coefficient. A priori information and some measurement information are combined to give information about what basis functions are not needed in the representation, leading to computationally economic multiresolution representation. Said projection data and said multiresolution representation is utilized in a regularized reconstruction method based on minimizing the penalty function $$F(f) = \|Af - m\|2/2 + \alpha \|f\|_B + \beta g(f)$$

over the coefficients in the said multiresolution representation to produce three-dimensional information of the object, f representing the object image vector, which comprises values of the X-ray attenuation coefficient inside the object, m representing projection data, A representing the X-radiation attenuation model matrix, $\alpha$ representing a positive number, $\beta$ representing a non-negative number, g representing a function returning zero for positive arguments and returning positive values for negative arguments and $\|f\|_B$ representing magnitude of f expressed in terms of coefficients of f in the multiresolution representation of f.

In the invention, projection data is a collection of images, where each image is either (i) a traditional projection image taken with X-ray source, object and detector stationary, (ii) scanned projection image taken with moving X-ray source, moving detector and moving detector pixels to form an image, or (iii) a tomosynthetic slice achieved by moving the X-ray source, object, and/or detector during the exposure for emphasizing some sharp layer inside the object and blurring other layers. For example, a panoramic dental X-ray imaging device produces a tomosynthetic slice with sharp layer along the dental arc.

The invention also relates to a medical X-ray device arrangement for producing three-dimensional information of an object in medical X-ray imaging, the medical X-ray device arrangement comprising an X-ray source for X-radiating the object from at least two different directions and a detector for detecting the X-radiation to form projection data of the object. The medical X-ray device arrangement comprises means for representing the X-ray attenuation coefficient inside the object by a linear combination of multiresolution basis functions. This multiresolution representation is such that not all of the basis functions are needed to represent the unknown coefficient. A priori information and some measurement information are combined to give information about what basis functions are not needed in the representation, leading to computationally economic multiresolution representation. Said projection data and said multiresolution representation is utilized in a regularized reconstruction method based on minimizing the penalty function $$F(f) = \|Af - m\|2/2 + \alpha \|f\|_B + \beta g(f)$$

over the coefficients in the said multiresolution representation to produce three-dimensional information of the object, f representing the object image vector, which comprises values of the X-ray attenuation coefficient inside the object, m representing projection data, A representing the X-radiation attenuation model matrix, $\alpha$ representing a positive number, $\beta$ representing a non-negative number, g representing a function returning zero for positive arguments and returning positive values for negative arguments and $\|f\|_B$ representing magnitude of f expressed in terms of coefficients of f in the multiresolution representation of f.

In the case of limited angle data, benefits of the invention over conventional CT reconstruction include reduced artefacts. Further, benefits of the invention over tomosynthesis include reduced artefacts, improved contrast and improved image quality.

BRIEF DESCRIPTION OF THE FIGURES

FIG. 2A: scanned projection image, where a narrow detector moves during exposure to form a projection image.

FIG. 2B: tomosynthetic slice where X-ray source and detector move during exposure to form a sharp layer inside the object.

FIG. 3A: dense full-angle data. FIG. 3B: dense limited-angle data.

FIG. 3C: sparse full-angle data. FIG. 3D: sparse limited-angle data.

DETAILED DESCRIPTION OF THE INVENTION

In practical imaging situations X-ray images are not always available from all around the body. The body might be visible only from certain directions due to imaging geometry. For example in mammography and intra-oral dental imaging the X-ray detector is in fixed position behind the tissue and the X-ray source moves with respect to the detector. This situation is called limited-angle tomography. Also, the number of radiographs should be minimized in medical applications for reducing the X-ray dose of the patient and shortening the time needed for imaging. Such situations lead to sparse projection data.

In the preferred embodiments of the invention a regularized inversion algorithm is used to create a new type of 3-D medical X-ray imaging using sparse projection data as input. This new imaging is intermediate between a projection radiograph and a full CT scan.

Figure 1:
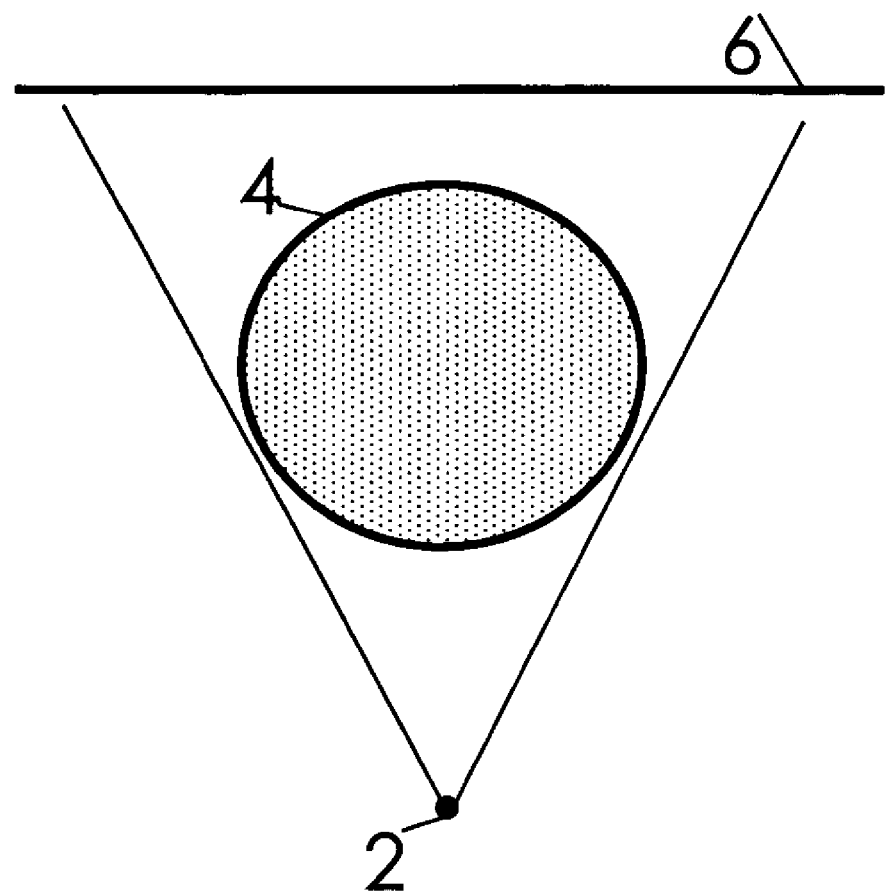
FIG. 1 shows the acquisition of a traditional X-ray projection image.

In FIG. 1 is shown a simple example of X-ray imaging, where an X-ray source 2 is placed on one side of an object 4 under imaging. Radiation passes through the object and is detected by a detector 6 on the other side. The X-ray source is for example an X-ray source of an intraoral X-ray source of a dentist, of a dental panoramic X-ray device, of a surgical C-arm X-ray device, of a mammography device, of a CT scanner or of any other medical X-ray device and the detector 6 is a detector of some of those devices. Usually the detector 6 is a digital sensor that can be thought of as a 2-D array of almost point-like detectors.

The 3-D body under imaging is modelled by non-negative X-ray attenuation coefficient g. The value gives the relative intensity loss of the X-ray travelling within a small distance dx:

$$\frac{dI}{I} = -g(x)dx \qquad (21)$$

The X-radiation has initial intensity $I_0$ when entering the object 4 and a smaller intensity $I_1$ when exiting the object. The following equation shows the attenuation law:

$$\int_L g(x)dx = -\int_L \frac{I'(x)}{I(x)}dx = \log I_0 - \log I_1 \qquad (22)$$

where initial intensity $I_0$ is known by calibration, and intensity after object $I_1$ is known from the corresponding point value in a projection image. Thus one pixel value in the measured data represents (i) the integral of g along one line L in case of a projection image.

In the above model scattering phenomena resulting in X-rays changing their direction, or the dependency of attenuation on the X-ray spectrum resulting in low-energy photons being more easily attenuated than high-energy ones, are not taken into account.

Figure 3A:
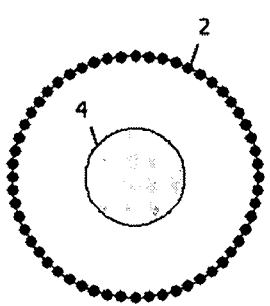
FIGS. 3A–3D show different types of projection data. Every black dot represents a location of the X-ray source for taking one projection image.
Figure 3B:
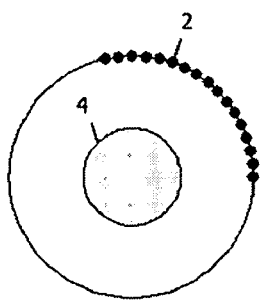
Figure 3C:
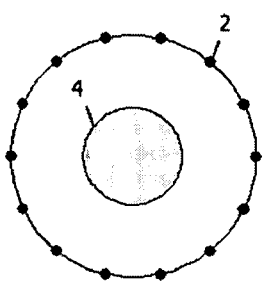
Figure 3D:
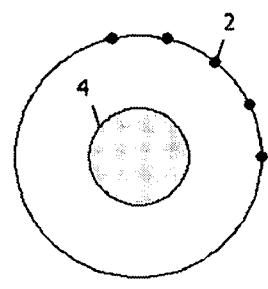

In medical imaging the geometrical arrangements of the X-ray source and digital sensor vary according to the diagnostic task and equipment. FIGS. 3A and 3B illustrate the types of tomographic data resulting from different imaging situations. For clarity, here are presented two-dimensional examples; similar situations can be considered in three dimensions. In the preferred embodiments of the invention, radiation dose is reduced using coarse sampling of the angular variable. FIGS. 3A and 3B present dense angular sampling with full angle and limited angle measurements, respectively. FIGS. 3C and 3D present coarse angular sampling, also with full and limited angles of measurement.

Figure 2A:
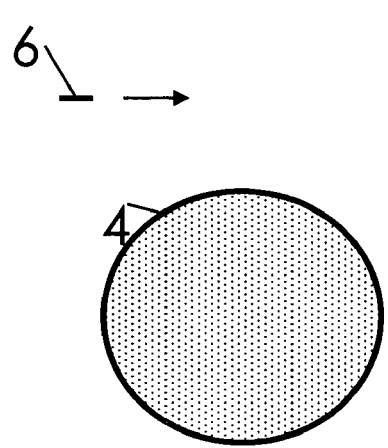
FIGS. 2A–2B show two kinds of data.
Figure 2B:
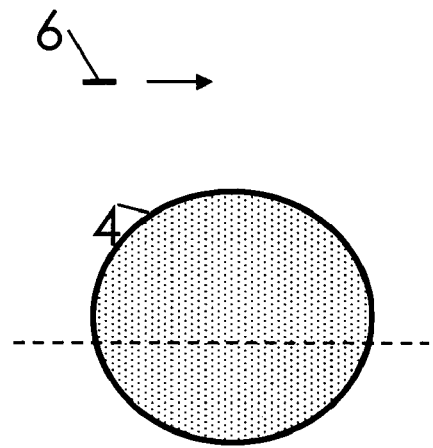
Figure 4:
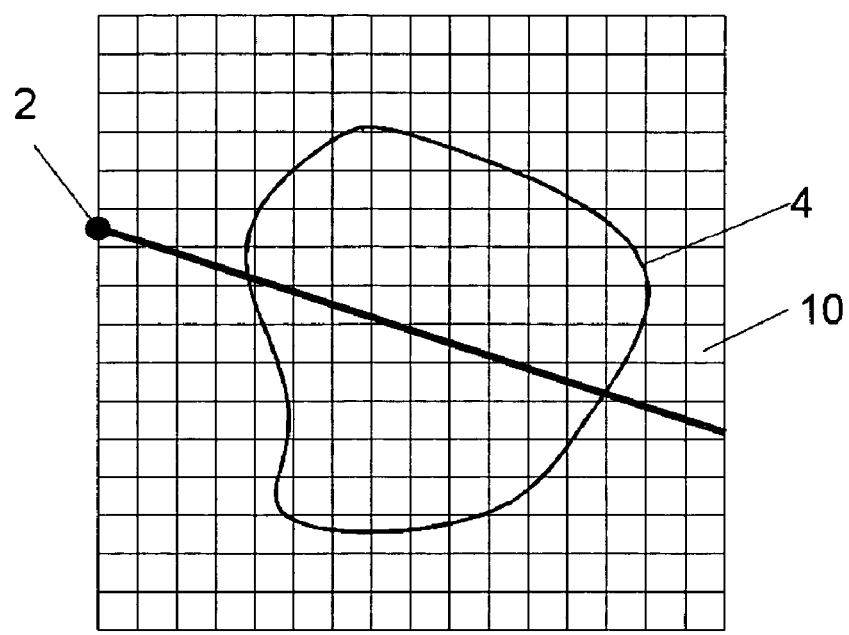
FIG. 4 shows "pencil beam" X-ray attenuation model.

When modelling the measurement mathematically the X-ray attenuation model and the observation can be assumed linear. The model is $m = Af + e$, where m represents measured pixel values, f represents the object image vector and e is a random error representing measurement noise. A is a linear operator modelling the X-ray attenuation process. A can model various ways to collect data. For example, A can model a collection of two or more measurements, where some of the measurements may be traditional projection images, some of the measurements may be scanned projection images, and some of the measurements may be tomosynthetic slices. Traditional projection image is acquired by keeping X-ray source 2, object 4 and detector 6 fixed during the exposure as shown in FIG. 1. Scanned projection image is acquired by keeping X-ray source 2 and object 4 fixed during the exposure while moving detector 6 and its pixels as shown in FIG. 2A. Tomosynthetic slice is acquired by keeping object 4 fixed during the exposure while moving detector 6, its pixels, and X-ray source 2 as shown in FIG. 2B to form an image where a layer inside the object is sharply shown and layers away from the sharp layer are blurred and superimposed. Also, A can model the discrete pencil beam model shown in FIG. 4, or the Radon transform.

Figure 5:
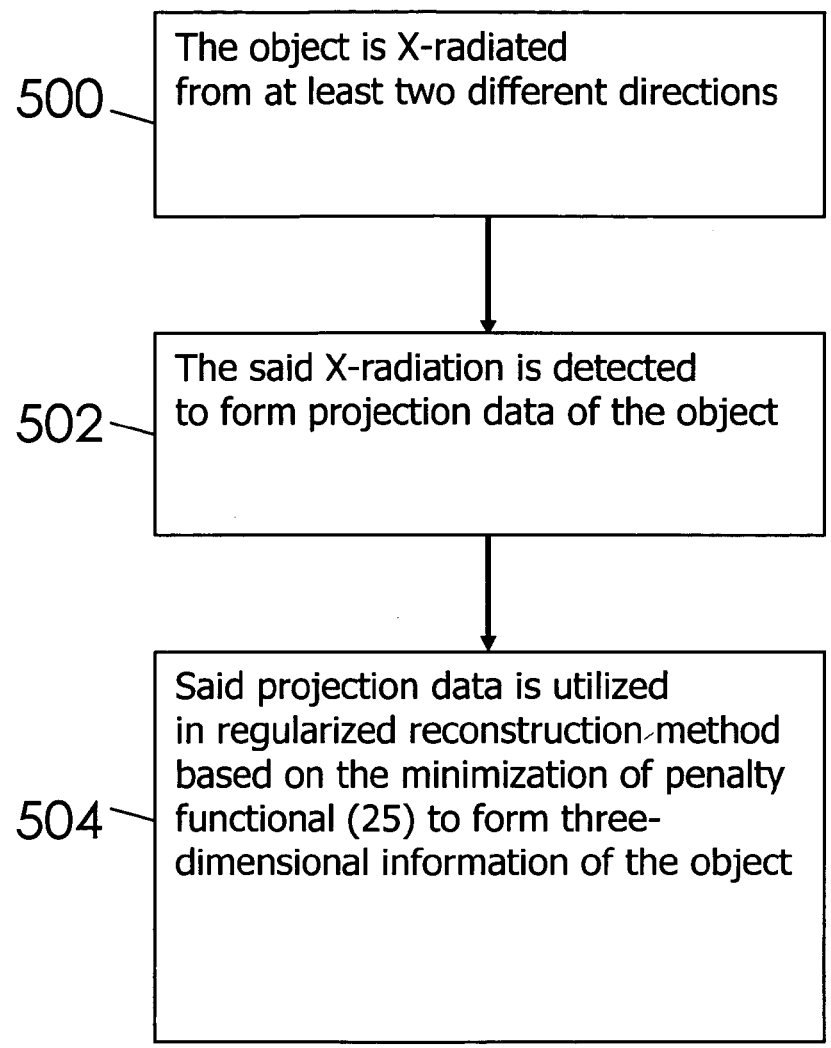
FIG. 5 shows basic flow chart of the method according to the invention.

In FIG. 5 is presented a basic flow chart of the method according to the invention. In method step 500 the object is X-radiated from at least two different directions. In method step 502 the said X-radiation is detected to form projection data of the object. In method step 504 said projection data is utilized in regularized reconstruction method based on the use of a multiresolution representation of the X-ray attenuation coefficient.

A regularized reconstruction method, as opposed to a general reconstruction method, produces reconstructions from given measurement data that are not sensitive to measurement noise. Regularization is very important in the reconstruction of an object from sparse projection data since said object is not completely specified by the data alone and a non-regularized reconstruction method is likely to produce reconstructions that are extremely sensitive to measurement noise.

The reconstruction process is based on two ideas. First, the unknown attenuation coefficient f is represented in the form $$f = \sum_j c_j \psi_j, \qquad (24)$$

where the coefficients $c_j$ are real numbers and $\psi_j$ is a basis function in a multiresolution basis. Suitable multiresolution bases include wavelets, curvelets, ridgelets, and many others. Second, only some of the coefficients in the multiresolution representation (24) are allowed to take nonzero values. The rationale behind the second idea is as follows. The most interesting features of the attenuation coefficient are boundaries between different tissue types. Typically the attenuation coefficient is smooth apart from such boundary curves. It is known that in the wavelet expansion, the coefficients most significantly deviating from zero correspond to basis functions located near the boundary curves. Thus the quality of reconstruction is not expected to decrease even if small coefficients in the multiresolution representation are replaced by zero. The crucial point of the method is that based on a suitable criterion, most of the wavelet coefficients are forced to be zero before the reconstruction process.

Figure 11:
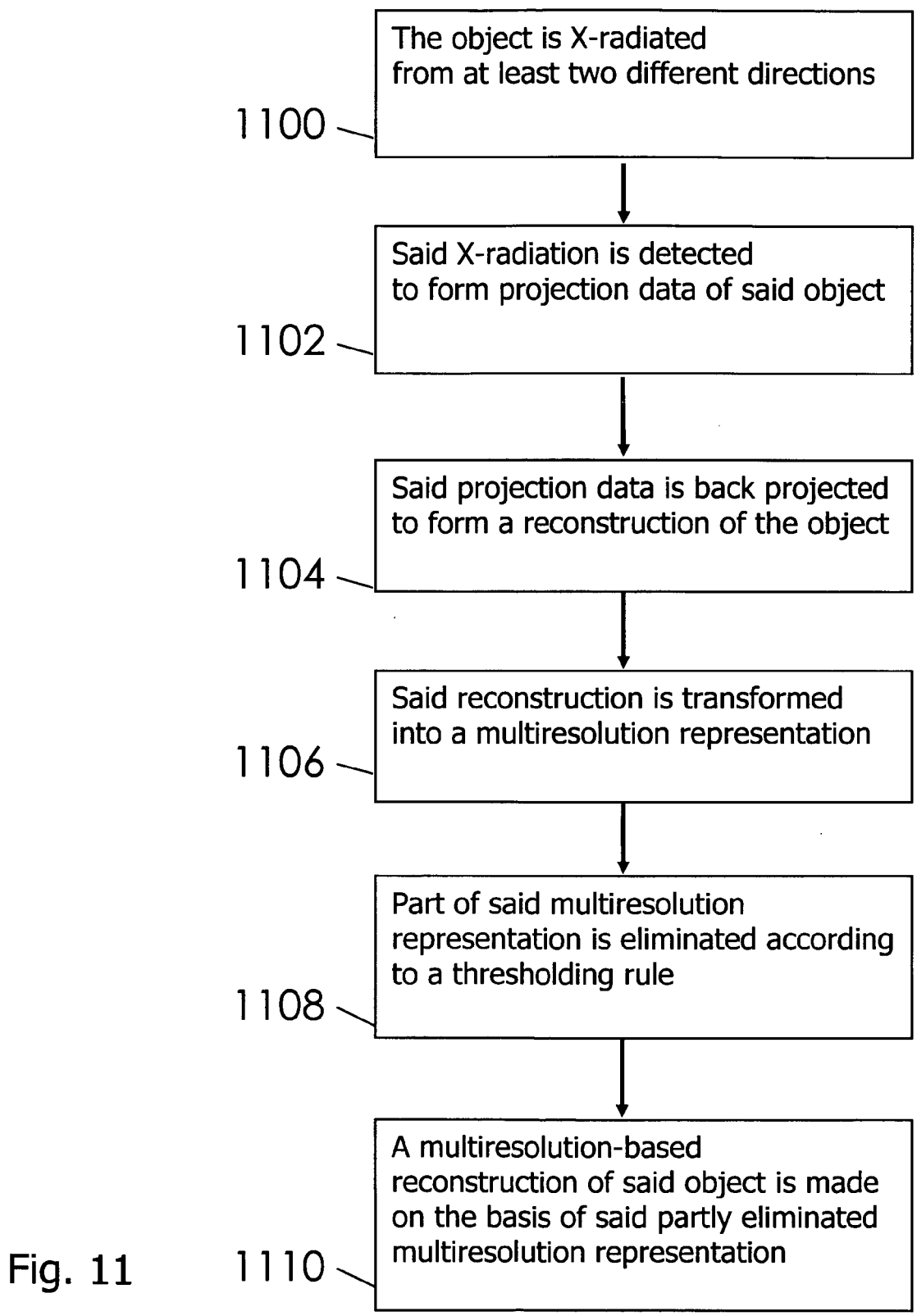
FIG. 11 shows basic flow chart of the thresholding method presenting one preferred embodiment of the invention.

There are at least three possible criteria for choosing the wavelet coefficients that will be set to zero. Next these three criteria are explained in detail. First elimination criterion: compute back-projection image BP using the given radiographs, compute the multiresolution representation of BP, and set to zero all coefficients that are small in absolute value. FIG. 11 show basic flow chart of the first elimination criterion. In method step 1100 the object is X-radiated from at least two different directions. In method step 1102 said X-radiation is detected to form projection data of said object. In method step 1104 said projection data is back-projected to form a reconstruction of the object. In method step 1106 said back-projection reconstruction is transformed into a multiresolution representation. In method step 1108 part of said multiresolution representation is eliminated according to a thresholding rule. In method step 1110 a multiresolution-based reconstruction of said object is made on the basis of said partly eliminated multiresolution representation.

Figure 12:
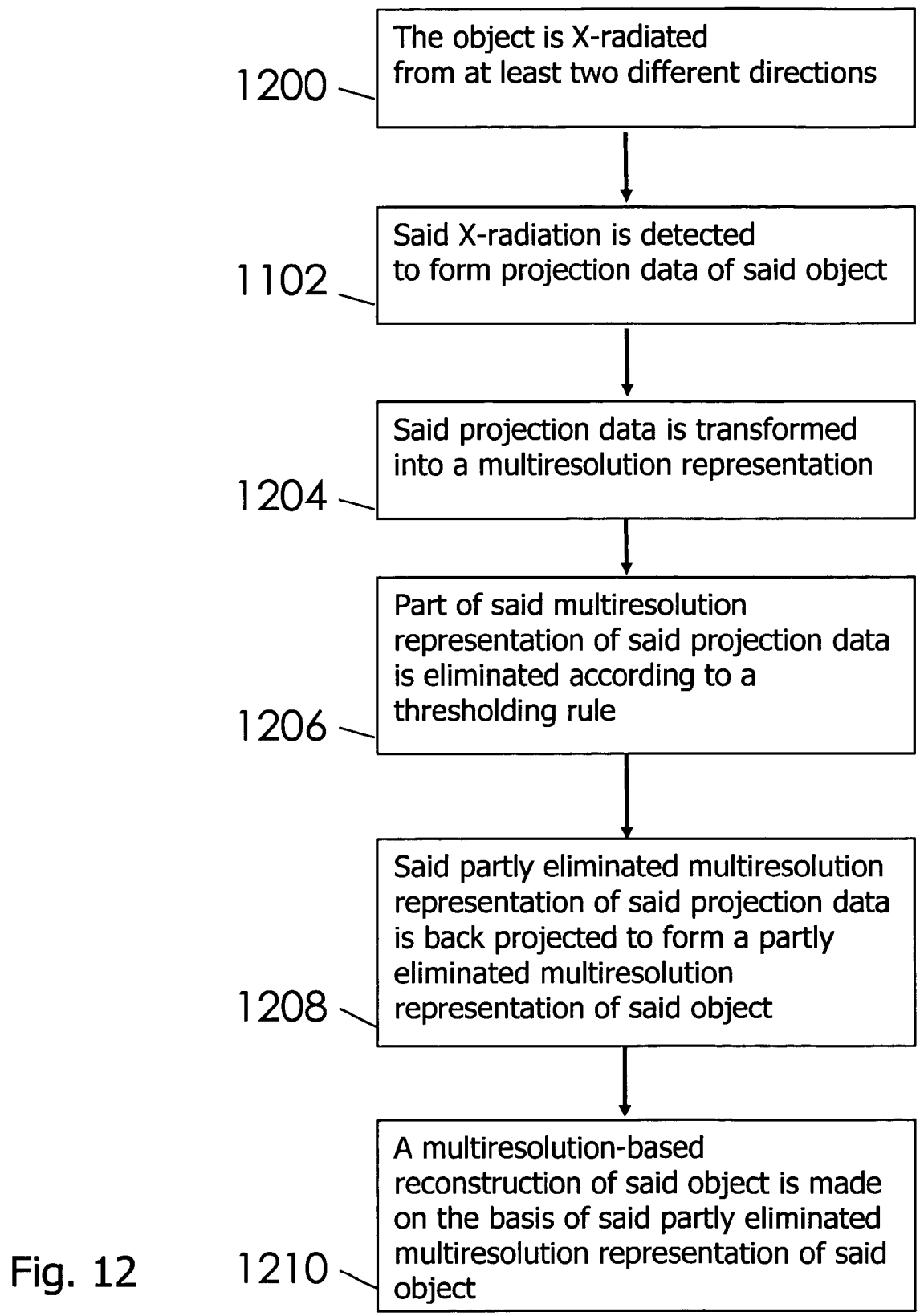
FIG. 12 shows basic flow chart of the thresholding method presenting one preferred embodiment of the invention.

Second elimination criterion: compute multiresolution representation of all projection images, set small coefficients to zero and back-project the remaining coefficients into the reconstruction domain. In the reconstruction, let only the coefficients on the back-projected set differ from zero. An additional criterion for selecting coefficients can be that they occur in at least two or more projection images. FIG. 12 shows basic flow chart of the second elimination criterion. In method step 1200 the object is X-radiated from at least two different directions. In method step 1202 said X-radiation is detected to form projection data of said object. In method step 1204 said projection data is transformed into a multiresolution representation. In method step 1206 part of said multiresolution representation of said projection data is eliminated according to a thresholding rule. In method step 1208 said partly eliminated multiresolution representation of said projection data is back-projected to form a partly eliminated multiresolution representation of said object. In method step 1210 a multiresolution-based reconstruction of said object is made on the basis of said partly eliminated multiresolution representation of said object.

Figure 13:
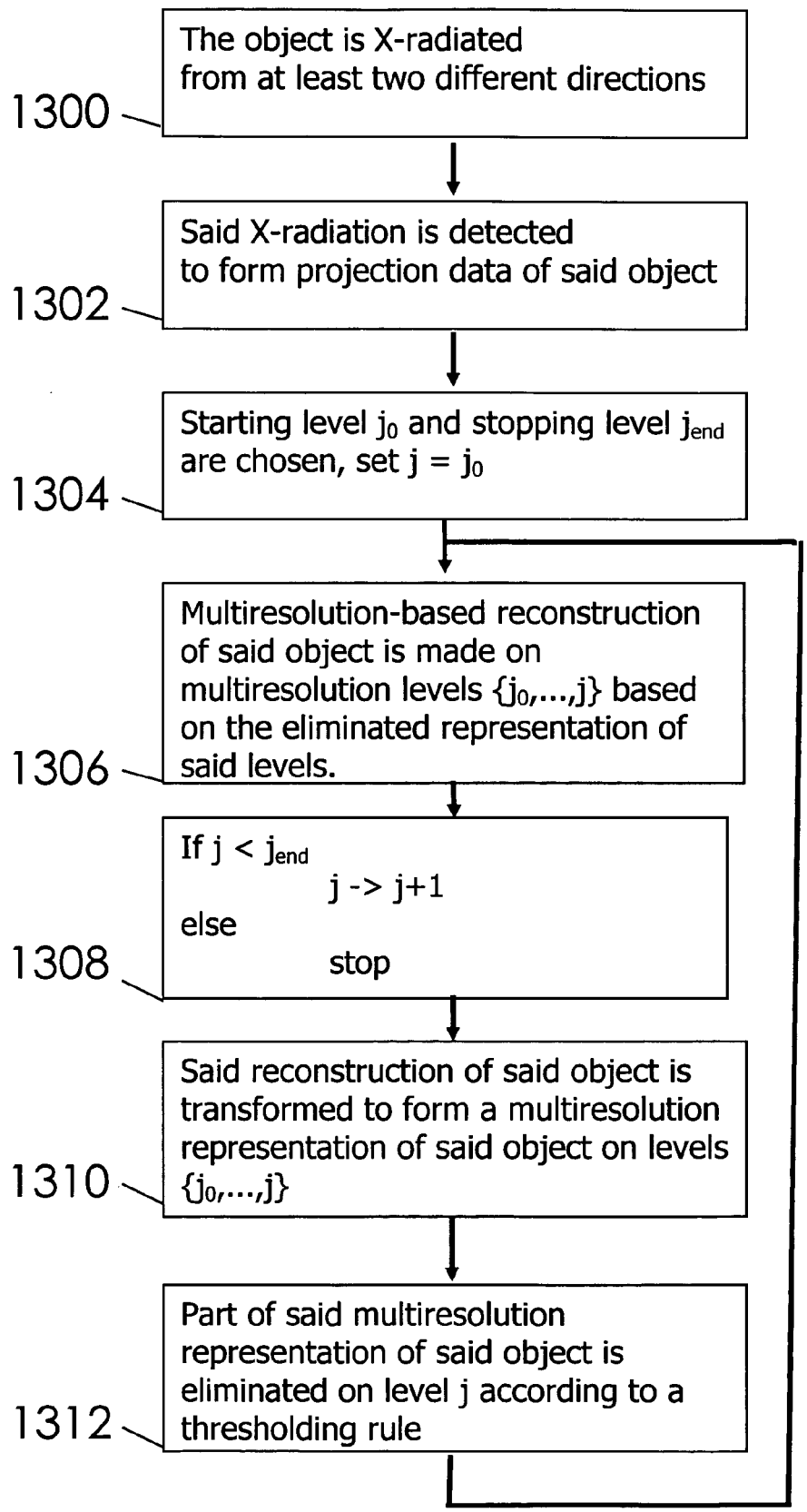
FIG. 13 shows basic flow chart of the thresholding method presenting one preferred embodiment of the invention.

Third elimination criterion: first compute a multiresolution-based reconstruction of the object using only the multiresolution coefficients of the N coarsest levels of scale (for example levels 1–4). Step 1: Compute the multiresolution representation of the reconstruction. Step 2: Choose the areas of the object where the multiresolution coefficients are large and take along the next level of multiresolution coefficients from these areas only. Step 3: Compute a multiresolution-based reconstruction with the multiresolution coefficients of levels N+1. Repeat steps 1, 2 and 3 until desired level is reached. FIG. 13 shows a basic flow chart of the third elimination criterion. In method step 1300 the object is X-radiated from at least two different directions. In method step 1302 said X-radiation is detected to form projection data of said object. In method step 1304 starting level $j_0$ and stopping level $j_{end}$ are chosen and index j is set to $j_0$. In method step 1306 a multiresolution-based reconstruction of said object is made on multiresolution levels $j_0$–j based on the eliminated representation of said levels. In method step 1308 stopping criterion is tested and if it is not fulfilled, the index j is increased by one. In method step 1310 said reconstruction of said object is transformed to form a multiresolution representation of said object on levels $\{j_0, \ldots, j\}$. In method step 1312 part of said multiresolution representation of said object id eliminated on level j according to a thresholding rule. The flow continues from step 1312 to step 1306 until said stopping criterion is fulfilled.

Although only three elimination criteria are described above, it is to be understood that the set of possible elimination criteria is not limited thereto but can be varied in many ways within the inventive idea disclosed.

After the elimination of some coefficients in the multiresolution representation for f, the following penalty functional is minimized over the remaining coefficients:

$$F(f) = \|Af - m\|2/2 + \alpha\|f\|_B + \beta g(f) \qquad (25)$$

where f represents the object image vector, which comprises values of the X-ray attenuation coefficient inside the object, m represents projection data, A represents the X-radiation attenuation model matrix, α represents a positive number, β represents a non-negative number, g represents a function returning zero for positive arguments and returning positive values for negative arguments and $\|f\|_B$ represents magnitude of f expressed in terms of coefficients of f in the multiresolution representation of f.

In the first preferred embodiment of the invention is presented an application to dental radiology.

X-ray projection images are conventionally used in dental radiology. However, certain diagnostic tasks require more precise knowledge of the 3-D structure of tissue than is available in two-dimensional radiographs.

Figure 7:
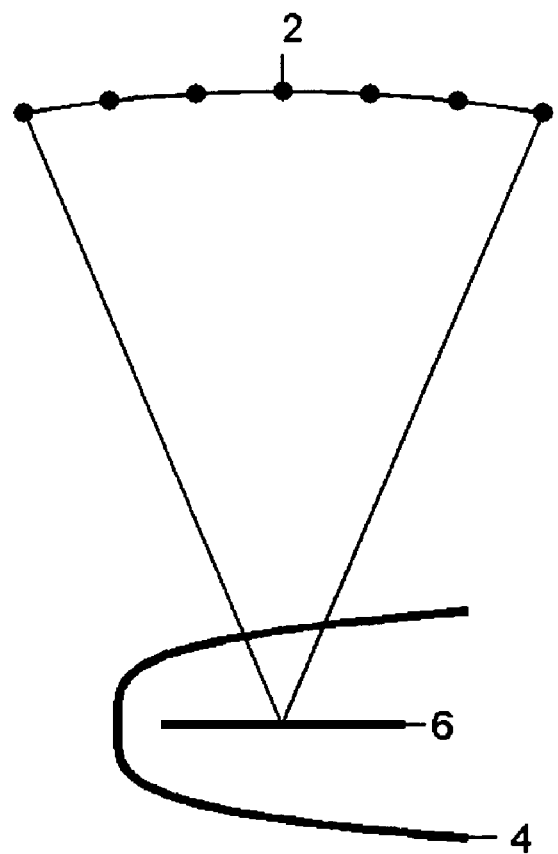
FIG. 7 shows measurement geometry of dental limited-angle tomography with a digital intraoral sensor.

In FIG. 7 is presented an intraoral X-ray device 5 arrangement presenting the first preferred embodiment of the invention. It is important to notice that this is only an example of a medical X-ray device 5 arrangement where the invention is possible to be utilized.

The medical x-ray device 5 in the preferred embodiments of the invention is for example a dental panoramic X-ray device, a surgical C-arm X-ray device, a CT scanner or a mammography device.

The example of the detector 6 used in the first preferred embodiment of the invention is based on charge coupled device (CCD) technology and has dynamic range of 4096 grey levels. The size of the active imaging area is 34 mm*26 mm and the resolution is 872*664 pixels. After exposure, each pixel contains an integer proportional to the number of X-ray quanta that hit the pixel's area.

Alternative detectors include any other digital intraoral sensor, digitized X-ray film, or any intraoral sensing device converting detected X-ray photons to a digital image.

Figure 6:
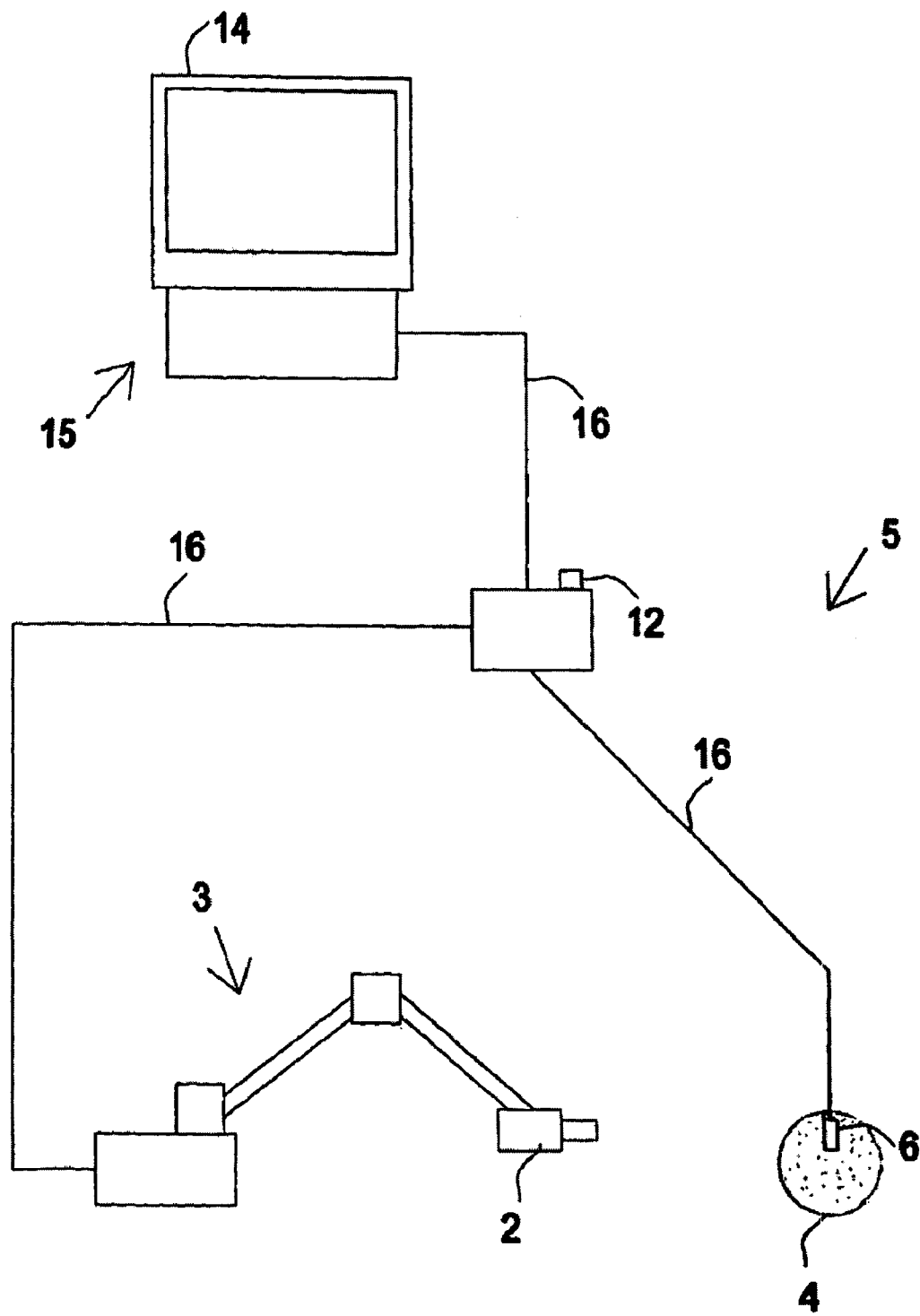
FIG. 6 shows an intraoral X-ray device arrangement presenting one preferred embodiment of the invention.

In the first preferred embodiment of the invention the articulated arm arrangement 3 moves the X-ray source 2 to the right position. The X-radiation begins by pressing the exposure button 12. The X-ray source 2 X-radiates the object 4, which is for example the teeth of a patient. The detector 6 detects the X-radiation. The image information achieved by detecting the X-radiation is sent by communication link 16 to the computer 14. Two or more X-ray images are taken as described above. The computer comprises the software means 15 to process the image information according to the invention. There can be more than one computer 14 and also the software means 15 can situate in more than one computer 14. For example the first computer 14 is computer that is used in x-ray imaging. The second computer 14 is computer that is used in processing the image information according to the invention. It is possible to have the second computer 14 far away from the actual medical x-ray device 5. For simplicity in FIG. 6 is shown only one computer 14.

In the first preferred embodiment (FIG. 7) of the invention, the dentist's X-ray equipment is used for taking a set of 2-D projection images that are used as input for a regularized reconstruction method based on the use of a multiresolution representation of the X-ray attenuation coefficient of the tissue. Such equipment includes an intraoral X-ray unit and a digital intraoral sensor.

In the preferred embodiments of the invention the three-dimensional problem can be reduced to a stack of two-dimensional problems each corresponding to a plane determined by a constant value of z. Here FIG. 7 represents exactly the situation in the xy-plane, i.e. the plane z=0. Each row in the detector corresponds to one such 2-D problem. This approach leads to small approximation error because the X-ray source does not move in the correct plane for nonzero z, and this error is neglected.

Next the modelling of a 2-D tomographic problem is explained. Let $$m(i) = A\,x(i) + e(i)$$

denote the $i^{th}$ 2-D tomographic problem. Here the vector m(i) contains the readings on $i^{th}$ row from each of the seven radiographs. The vector x(i) is the $i^{th}$ slice of the 3-D representation x of the object 4 under imaging. Now x(i) is a 2-D array of pixels. In the preferred embodiments, the matrix A comes from the two-dimensional pencil beam model for X-ray attenuation. This is presented in FIG. 4. There the unknown 2-D slice of the object 4 is divided into small pixels 10, and the matrix A contains the length of the path of the X-ray inside each pixel.

The mathematical modelling of the object 4, i.e., incorporation of prior information, is next explained for the 2-D slice. For simplicity, the slice index i is fixed and not explicitly indicated.

Here multiresolution representation is chosen to be wavelet expansion. Let $\phi$ and $\psi$ be the orthonormal scaling and wavelet function, respectively, of some one-dimensional multiresolution analysis. Then in two dimensions, $$\phi(x) = \phi(x_1)\phi(x_2),\ x = (x_1, x_2)$$

is the scaling function, and $$\psi^1(x) = \phi(x_1)\psi(x_2),\ \psi^2(x) = \psi(x_1)\phi(x_2),\ \psi^3(x) = \psi(x_1)\psi(x_2),$$

are the wavelet functions of three types. Denote by $$\psi_{jkl}(x) = 2^{-j/2}\psi^l(2^{-j}x - z_{jk}),\ \phi_{jk}(x) = 2^{-j/2}\phi(2^{-j}x - z_{jk}),$$

the scaled, dilated and translated functions. Here, index j is related to the scale, k to the location in space, and l to the wavelet type, l=1, 2, 3. The wavelet expansion of a function f is $$f = \sum_k c_{0k}\phi_{0k} + \sum_{j\geq 0}\sum_k\sum_{l=1}^{3} w_{jkl}\psi_{jkl}. \tag{26}$$

Figure 9:
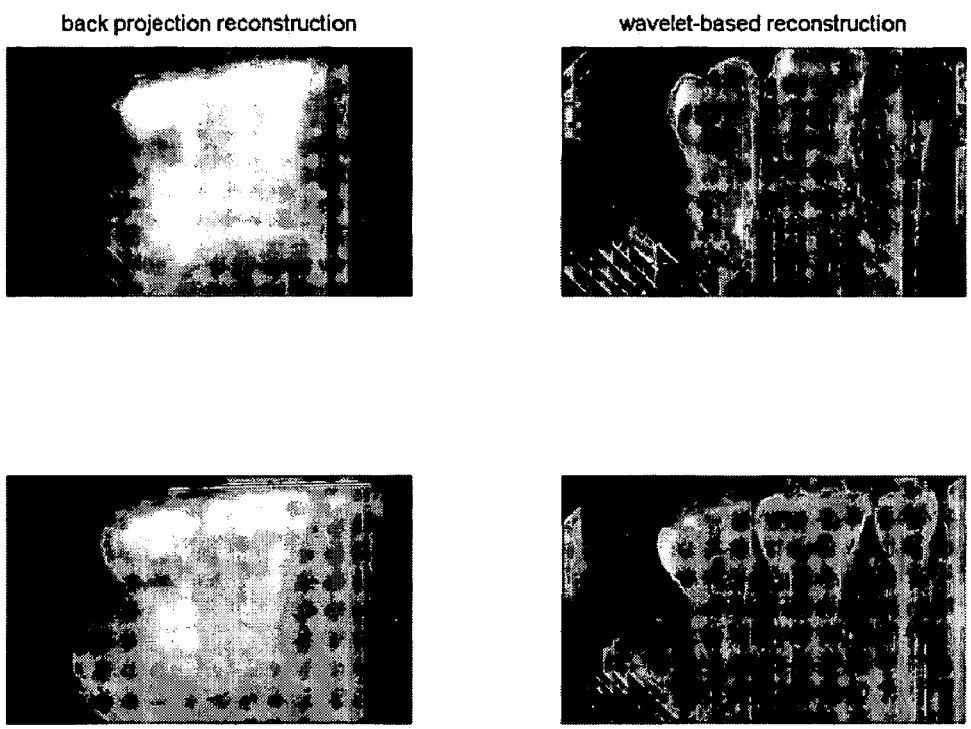
FIG. 9 shows results of 3-D reconstruction of head phantom in the first preferred embodiment. Left column: tomosynthetic slices through the teeth of the head phantom. Right column: corresponding slices produced by the invention.

The first elimination criterion is used. The norm used in the first preferred embodiment is $$\|f\|_B = \|c_0\|_{l_p} + \left[\sum_{j=0}^{\infty}\left(2^{j\left(s+\frac{1}{2}-\frac{1}{p}\right)}\|w_j\|_{l_p}\right)^q\right]^{\frac{1}{q}}, \tag{27}$$

where p, q and s are numbers. Results from sparse projection data collected from in vitro human head phantom are shown in FIG. 9.

Figure 8:
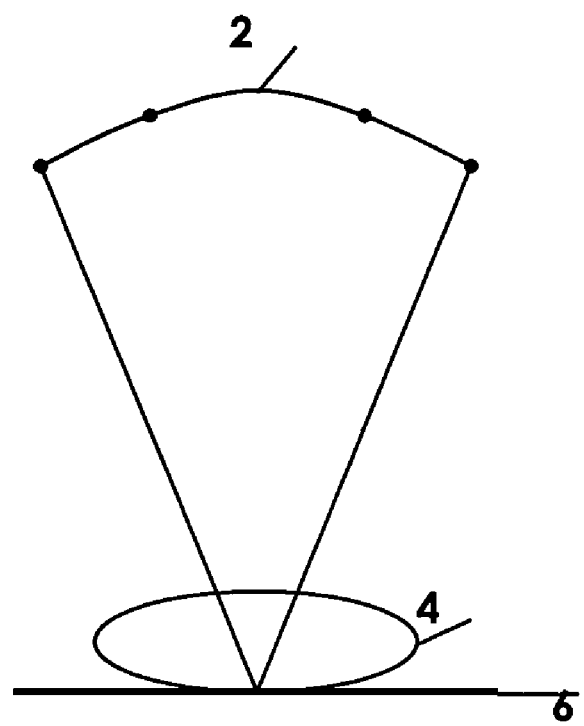
FIG. 8 shows measurement geometry of mammography limited-angle tomography with a mammography device.
Figure 10:
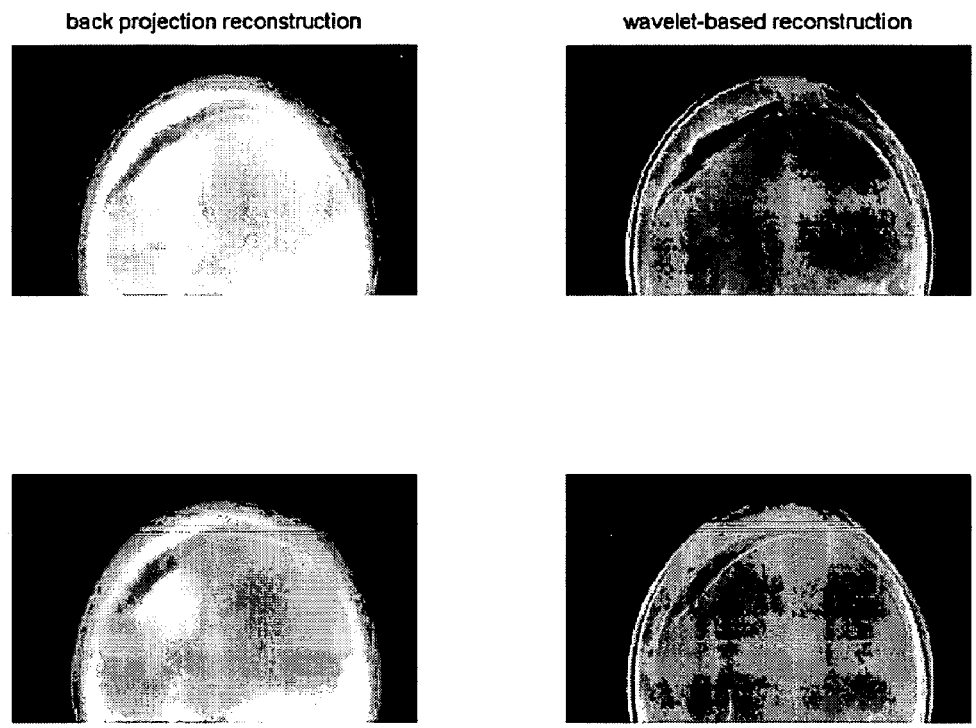
FIG. 10 shows results of 3-D reconstruction of mammography specimen in the second preferred embodiment. Left column: tomosynthetic slices through the specimen. Right column: corresponding slices produced by the invention.

In the second preferred embodiment the invention is utilized in mammography imaging (FIG. 8). There the object 4 is a human breast and the medical x-ray device 5 arrangement is full-field digital mammography equipment. The cross section is X-radiated from a limited-angle collection of directions, and the reconstruction is computed analogously to the first preferred embodiment. Results from sparse projection data collected from a mammography specimen are shown in FIG. 10.

In the first and second preferred embodiments of the invention the basic method steps are same as mentioned with the flow chart in FIG. 11. The utilizing of the invention in the second preferred embodiment is similar to what is described with the first preferred embodiment of the invention and elsewhere in this application except different medical x-ray imaging applications and their differences because of different medical x-ray devices and different objects to be x-ray imaged.

Although the invention is described above with reference to the examples illustrated in the attached figures, it is to be understood that the invention is not limited thereto but can be varied in many ways within the inventive idea disclosed.

The invention claimed is:

1. A method for producing three-dimensional information of an object in medical X-ray imaging in which method the object is X-radiated from at least two different directions and the said X-radiation is detected to form projection data of the object, characterized in that, X-ray attenuation coefficients of said object are modelled using a multiresolution representation, part of the coefficients in said multiresolution representation is eliminated to form reduced multiresolution representation, and said projection data is utilized in a regularized reconstruction method based on minimizing the penalty $$F(f)=\|Af-m\|2/2+\alpha\|f\|_B+\beta g(f)$$

over the coefficients in the said reduced multiresolution representation, f representing the object image vector, which comprises values of the X-ray attenuation coefficient inside the object, m representing projection data, A representing the X-radiation attenuation model matrix, $\alpha$ representing a positive number, $\beta$ representing a non-negative number, g representing a function returning zero for positive arguments and returning positive values for negative arguments and $\|f\|_B$ representing magnitude of f expressed in terms of coefficients of f in the multiresolution representation of f, such that said three-dimensional medical X-ray imaging information of the object is reconstructed from said regularized reconstruction method.

2. A method according to claim 1, characterized in that the three-dimensional information of the object is provided as a stack of two-dimensional reconstructed slices and the multiresolution representation on each two-dimensional slice is wavelet expansion.

3. A method according to claim 1, characterized in that the three-dimensional information of the object is provided as a stack of two-dimensional reconstructed slices and the multiresolution representation on each two-dimensional slice is curvelet expansion.

4. A method according to claim 1, characterized in that the three-dimensional information of the object is provided as attenuation values in a collection of three-dimensional volume elements and the multiresolution representation is three-dimensional wavelet expansion.

5. A method according to claim 1, characterized in that when forming the reduced multiresolution representation, first back-projection image is computed using the given radiographs, then multiresolution representation of said back-projection image is computed, and coefficients that are small in absolute value in the said multiresolution representation are eliminated.

6. A method according to claim 1, characterized in that when forming the reduced multiresolution representation, first multiresolution representations of all given radiographs are computed, then small coefficients in the said multiresolution representations are eliminated and remaining coefficients back-projected to form a temporary image of possibly non-zero coefficients in the multiresolution representation of the X-ray attenuation coefficient, and all coefficients in the multiresolution representation of the X-ray attenuation coefficient that do not belong to said temporary image are eliminated.

7. A method according to claim 1, characterized in that when forming the reduced multiresolution representation, first compute a reconstruction image using only the multiresolution coefficients of the N coarsest levels of scale, second, compute multiresolution representation of the reconstructed image, third, choose the areas of the image where the wavelet coefficients are small and eliminate multiresolution representation coefficients of level N+1 from said areas, fourth, compute a reconstruction image using the multiresolution representation coefficients of N coarsest levels of scale and the remaining coefficients on level N+1, fifth, repeat the above sequence until desired scale is reached.

8. A method according to claim 1, characterized in that the projection data m consists of two or more projection images, of which none or more being traditional projection images, none or more being scanned projection images, and none or more being tomosynthetic slices.

9. A medical X-ray device arrangement for producing three-dimensional information of an object in a medical X-ray imaging, the medical X-ray device arrangement comprising an X-ray source for X-radiating the object from at least two different directions and a detector for detecting the X-radiation to form projection data of the object, characterized in that the medical X-ray device arrangement comprises: a computer configured to execute the following steps:

modelling X-ray attenuation coefficients of said object using a multiresolution representation, eliminating part of the coefficients in said multiresolution representation to form reduced multiresolution representation, and utilizing said projection data in a regularized reconstruction method based on minimizing the penalty $$F(f)=\|Af-m\|2/2+\alpha\|f\|_B+\beta g(f)$$

over the coefficients in the said reduced multiresolution representation f representing the object image vector, which comprises values of the X-ray attenuation coefficient inside the object, m representing projection data, A representing the X-radiation attenuation model matrix, $\alpha$ representing a positive number, $\beta$ representing a non-negative number, g representing a function returning zero for positive arguments and returning positive values for negative arguments and $\|f\|_B$ representing magnitude of f expressed in terms of coefficients of f in the multiresolution representation of f, such that said three-dimensional medical X-ray imaging information of the object is reconstructed from said regularized reconstruction method.

10. A medical X-ray device arrangement according to claim 9, characterized in that the three-dimensional information of the object is provided as a stack of two-dimensional reconstructed slices and the multiresolution representation on each two-dimensional slice is wavelet expansion.

11. A medical X-ray device arrangement according to claim 9, characterized in that the three-dimensional information of the object is provided as a stack of two-dimensional reconstructed slices and the multiresolution representation on each two-dimensional slice is curvelet expansion.

12. A medical X-ray device arrangement according to claim 9, characterized in that the three-dimensional information of the object is provided as attenuation values in a collection of three-dimensional volume elements and the multiresolution representation being three-dimensional wavelet expansion.

13. A medical X-ray device arrangement according to claim 9, characterized in that when forming the reduced multiresolution representation, first back-projection image is computed using the given radiographs, then multiresolution representation of said back-projection image is computed, and coefficients that are small in absolute value in the said multiresolution representation are eliminated.

14. A medical X-ray device arrangement according to claim 9, characterized in that when forming the reduced multiresolution representation, first multiresolution representations of all given radiographs are computed, then small coefficients in the said multiresolution representations are eliminated and remaining coefficients back-projected to form a temporary image of possibly non-zero coefficients in the multiresolution representation of the X-ray attenuation coefficient, and all coefficients in the multiresolution representation of the X-ray attenuation coefficient that do not belong to said temporary image are eliminated.

15. A medical X-ray device arrangement according to claim 9, characterized in that when forming the reduced multiresolution representation, first compute a reconstruction image using only the multiresolution coefficients of the N coarsest levels of scale, second, compute multiresolution representation of the reconstructed image, third, choose the areas of the image where the wavelet coefficients are small and eliminate multiresolution representation coefficients of level N+1 from said areas, fourth, compute a reconstruction image using the multiresolution representation coefficients of N coarsest levels of scale and the remaining coefficients on level N+1, fifth, repeat the above sequence until desired scale is reached.

16. A medical X-ray device arrangement according to claim 9, characterized in that the projection data m consists of two or more projection images, of which none or more being traditional projection images, none or more being scanned projection images, and none or more being tomosynthetic slices.

* * * * *